May 23, 1967  J. M. ROETHLISBERGER ETAL  3,320,771
DRIVE SHAFT WITH LIMITED TORSIONAL RESILIENCE
Filed Sept. 20, 1965

INVENTORS
Jerry M. Roethlisberger &
BY Elmer R. Wagner
J. L. Carpenter
ATTORNEY

United States Patent Office 3,320,771
Patented May 23, 1967

3,320,771
DRIVE SHAFT WITH LIMITED TORSIONAL RESILIENCE
Jerry M. Roethlisberger, Bridgeport, and Elmer R. Wagner, Bay City, Mich., assignors to General Motors Corporation, Detroit, Mich., a corporation of Delaware
Filed Sept. 20, 1965, Ser. No. 488,379
8 Claims. (Cl. 64—27)

The invention relates to drive shafts and, more particularly, to a vehicle drive axle having coupling means of limited torsional resilience to reduce audible noise in the vehicle drive train at low torque levels while permitting a solid connection to be made to limit the force applied to the resilient means at high torque levels.

In automotive vehicle drive trains, there are a number of sources of torsional vibration which may combine to produce audible noise in the running gear and body of the vehicle. Such sources of vibration include, for example, the intermittent engagement of gear teeth in transmissions and differentials, tread pattern and irregularities in the vehicle tires and irregularities in the road surface over which the vehicle is driven. In addition, all such drive trains include a number of connections which have lash and may contribute to torsional vibrations and the resultant audible noise whenever the direction of torque in the drive train changes.

By introducing a torsional spring in the system, torque reversals are made less instantaneous and torsional vibrations in the system are, to some extent, absorbed rendering the system more quiet. Furthermore, if the spring is of rubber, damping occurs with further improvement in the system noise level.

For use in a drive axle, a coupling must have a capacity to absorb high torsional loads but needs only a relatively small torsional spring effect to make a significant reduction in audible noise. For this purpose, therefore, a coupling of limited torsional resilience is ideal.

The present invention involves a drive axle assembly incorporating a coupling of limited torsional resilience to reduce audible noise in the drive train. The axle assembly includes a multi-piece rubber coupling member which is torsionally resilient but radially stiff so as to hold the two ends of the drive axle in coaxial alignment. Interlocking tongue and fork members are provided which permit limited relative angular displacement of the two halves of the shaft but give positive engagement at the limiting points to absorb directly high torque loads on the shaft without exceeding the torque capacity of the resilient means in the coupling.

In order to prevent the drive axle halves from pulling apart in case of complete failure of the rubber driving means, simple snap ring retaining means are provided which seat in cooperating arcuate internal groove portions formed internally of the projecting lug and fork elements. To assemble the unit, the snap ring is installed in one of the main coupling halves and then the other coupling half is brought into engagement therewith. This deforms the snap ring slightly until it snaps into position in the arcuate groove portion of the other coupling half at which point the coupling halves are permanently retained in interlocked driving engagement.

Additional objects and advantages of the invention will be made apparent by the following description and drawings of a preferred embodiment in which.

Figure 1:
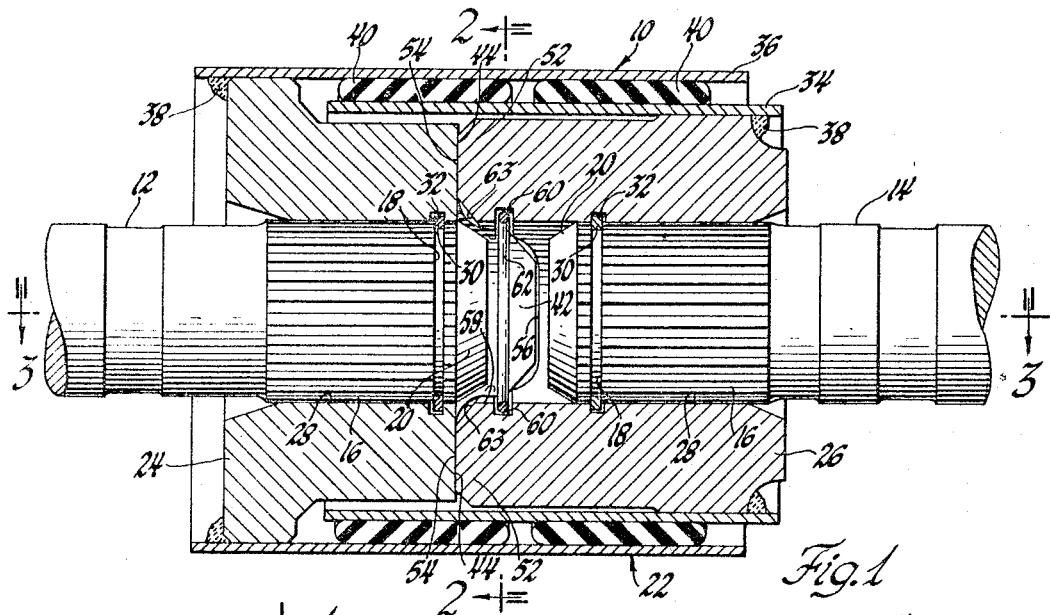
FIGURE 1 is a fragmentary cross-sectional view of a drive axle according to the invention taken generally along the longitudinal plane indicated by the line 1—1 of FIGURE 2.
Figure 2:
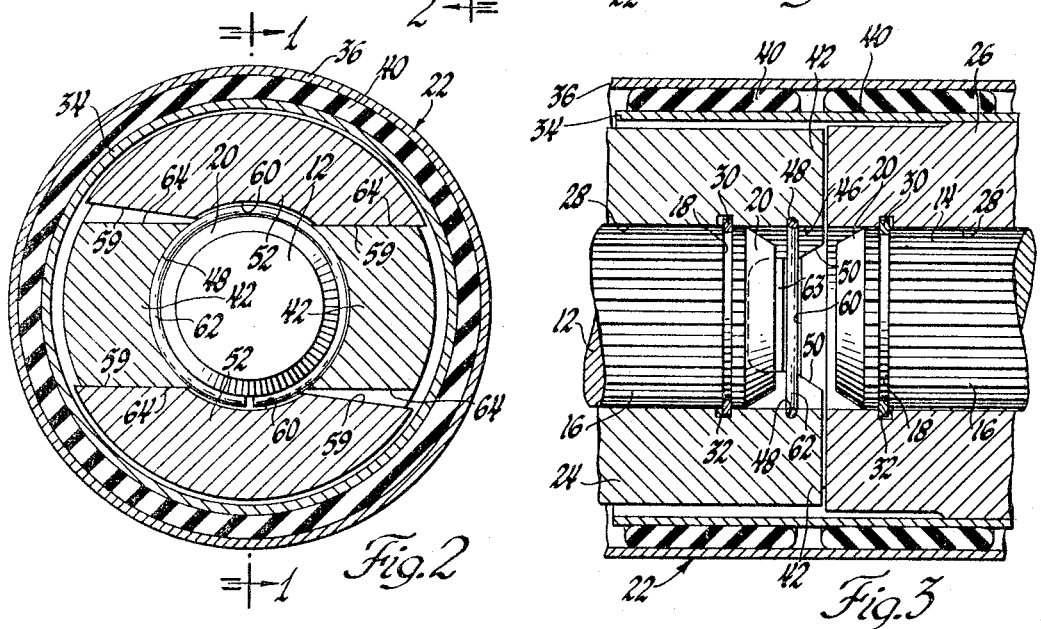
FIGURE 2 is a transverse cross-sectional view taken generally along the plane indicated by the line 2—2 of FIGURE 1.
Figure 3:
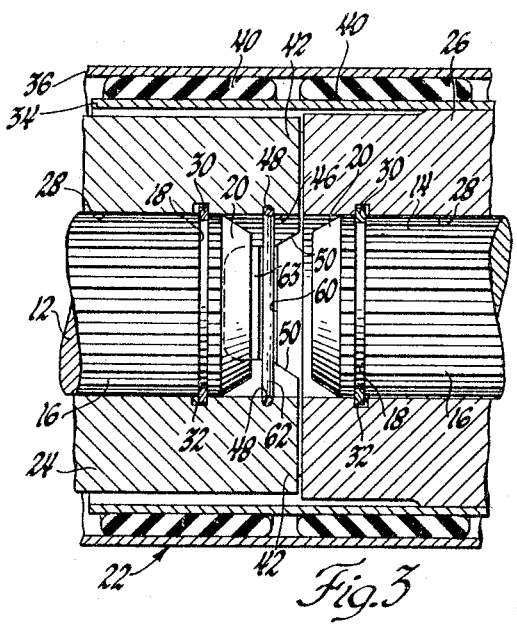
FIGURE 3 is a fragmentary cross-sectional view taken generally along the longitudinal plane indicated by the line 3—3 of FIGURE 1.

Referring now to the drawings, FIGURES 1–3 illustrate a drive axle assembly generally indicated by numeral 10 and comprising a pair of drive shafts 12 and 14 disposed end to end in coaxial relationship and having their adjacent ends splined as at 16 and provided with annular grooves 18. The ends of the axle shafts are chamfered at 20 for a purpose to be later described.

The two drive shafts are retained in coaxial and driving relation by coupling means generally indicated by numeral 22. The coupling means comprise a pair of hubs 24 and 26 having splined internal bores 28 and secured in abutting relationship by means to be later described. The drive shafts 12 and 14 are retained within hubs 24 and 26, respectively, by means of the cooperating splines 16 and 28 and by snap rings 30 which engage annular grooves 18 in the shaft and internal annular grooves 32 provided in the splined bores 28 of the hubs.

Hub 26 carries thereon a cylindrical sleeve 34 which is concentric with the axis of the coupling 10 and extends longitudinally for the length of hub 26 and beyond about half the length of hub 24 so as to surround the inner end thereof. Similarly, hub 24 carries an outer cylindrical sleeve 36 which extends longitudinally the length of hub 24 and beyond almost the length of hub 26, coaxially surrounding the inner sleeve 34 for a major portion of its length. The inner and outer sleeves 34 and 36 are secured to their respective hubs 26 and 24 by welding as at 38 or in any other suitable manner.

Between the inner and outer sleeves 34 and 36, a pair of doughnut-shaped rubber members 40 are disposed. The members 40 are longitudinally spaced and are tightly compressed at assembly so that they are sufficiently stiff radially to hold the two hub members and the inner ends of the drive shafts in coaxial relationship and to prevent the drive shaft assembly from bending excessively when supported at its outer ends (not shown in the drawings). The rubber members 40 are torsionally resilient, however, so that the transmission of torque through the rubber doughnut-shaped members will result in the relative angular displacement of the two hub members in proportion to the amount of torque transmitted. The spring rate of the rubber members in torsion is relatively low so that the coupling will effectively absorb torsional vibrations occurring at low loads including those occasioned by torque reversals in the system. The use of rubber as the spring element introduces damping due to the internal friction of the rubber itself.

Figure 4:
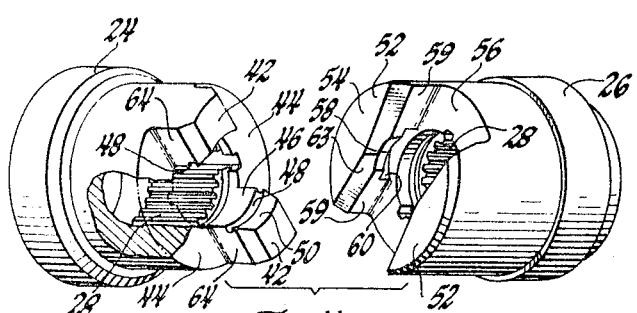
FIGURE 4 is a pictorial view showing certain interior parts of the coupling of FIGURES 1–3 in disassembled relation.

Because of the low torsional rate of the rubber elements, their capacity for absorbing torque is necessarily limited and, thus, the coupling includes means for preventing the capacity of the rubber elements from being exceeded and permitting a positive drive to be obtained through the coupling at all loads above a preselected torque limit. In the disclosed embodiment, the means used for this purpose comprise mating lug and fork means formed on the abutting ends of the hubs 24 and 26 which are clearly shown in the pictorial view of FIGURE 4.

Hub 24 carries a lug member 42 which extends transversely across the inner end of coupling member 24, jutting out a short distance from the adjoining end face 44 of the hub. The lug member is divided into two parts by central bore 46 located axially of the hub. Arcuate groove portions 48 are cut into the inner faces of the lug halves near the ends of the lug and the inner edges 50 are chamfered for a purpose to be subsequently described.

Hub 26 has formed at its inner end a fork construction comprising a pair of extending arms 52 which interlock with the lug member 42 of hub 24, the end faces 54 of arms 52 abutting against end face 44 of hub 24.

Between arms 52, the end of hub 26 is cut away at 56 to provide clearance for receiving lug member 42. A central bore 58 is cut into the inner faces 59 of arms 52 similar to the bore 46 in lug 42 and a pair of arcuate groove portions 60 are cut into the sides of the bore 58. With the coupling assembled, as shown in FIGURES 1–3, arcuate groove portions 48 and 60 are located in a single plane and receive a resilient retaining ring 62 which would hold the two hub portions in assembled relation even though the rubber elements 40 of the coupling should fail completely. The inner edges of arms 52 are chamfered at 63 to assist in assembly of the hub members over the retaining ring.

In order to provide clearance for relative angular rotation of the hub members, the sides 64 of lug member 42 are cut straight and parallel to one another while the inner faces 59 of fork arms 52 are angled slightly outwardly. The amount of this angle is optional depending upon the angle of relative rotation desired in a specific installation. In the present instance, the construction is arranged so that, in the no-load position of the coupling, the side faces of the lug engages the inner faces of the arms 52 in one direction so that relative angular rotation is permitted only in one direction. As installed in a vehicle, this permits a relatively soft coupling for damping torsional vibration during torque reversals and at light loads in the forward direction of travel while giving a solid coupling with a minimum of flexibility for travel in a reverse direction and in a forward direction at loads above a predetermined torque value.

The abutment of end faces 54 of the fork arms 52 against end face 44 of coupling 24 assists in stabilizing the two members and in keeping them in coaxial alignment.

The axle assembly disclosed herein may be assembled in the following manner. The sleeve members 34, 36 are secured to their respective hub members, 26, 24. Then a pair of rubber members 40 are mounted upon inner sleeve 34 and preferably cemented in place thereon. Retaining ring 62 is then snapped into place within arcuate groove portions 48 of lug 42. The rubber members 40 are then compressed so that outer sleeve 36 may be slipped thereover and the sleeve and hub assemblies are forced into place. At the same time, ring 62 is compressed slightly by riding up chamfers 63 of fork arms 52 and snaps into arcuate groove portions 60 when the end faces 54 of the fork arms are forced into engagement with end face 44 of hub 24.

The coupling member is now assembled and it is only necessary to install snap rings 30 in grooves 32 of the hub members and slide drive shafts 12 and 14 into place in the splined bores of the hub members. As the axle shafts are inserted, the snap rings 30 ride up chambers 20 and are expanded into clearance provided in grooves 32 and then snap into place in annular grooves 18 provided on the shafts, retaining the shafts permanently in assembled relation with the coupling and providing a complete axle shaft assembly for use in an automotive vehicle.

Numerous variations and changes could be made in the invention disclosed herein without departing from the inventive concept and the invention is, accordingly, to be limited only by the language of the appended claims.

We claim:

1. A drive shaft assembly of limited torsional resilience comprising first and second shaft members coaxially disposed and having opposed ends in abutting relationship, torsionally resilient means connecting said shaft members to absorb torsional vibrations and transmit torque between said members in proportion to their relative angular displacement from a nominal position, said means being radially stiff to hold said hub members in coaxial alignment, interlocking means on said first and second shaft members to limit the relative angular displacement of said members and form a solid driving connection between them when said limit is reached, said interlocking means having internal arcuate groove portions located so as to form a substantially annular internal groove and retaining ring means received in said arcuate groove portions to retain said shaft members in abutting and driving relationship upon failure of said resilient means.

2. The combination of claim 1 wherein said interlocking means includes lug means on said first shaft member interlocking with fork means on said second shaft member.

3. The combination of claim 2 wherein said shaft members include axially directed, overlapping concentric cylindrical portions and said resilient means comprises annular elastic means connecting said concentric cylindrical portions.

4. The combination of claim 3 wherein said elastic means comprise a pair of doughnut-shaped rubber members longitudinally spaced from one another and tightly compressed between said cylindrical portions.

5. A shaft coupling of limited torsional resilience for retaining a pair of drive shaft members in coaxial torque transmitting relation, said coupling comprising first and second hub members each adapted to be secured to one of said pair of drive shaft members, said hub members being coaxially disposed and having their ends in abutting relationship, torsionally resilient means connecting said hub members to absorb torsional vibrations and transmit torque between said members in proportion to the relative angular displacement of said hub members from a nominal position, said means being radially stiff to hold said hub members in coaxial alignment, interlocking means on said hub members to limit the relative angular displacement of said members and to form a solid driving connection when said limit is reached, said interlocking means having internal arcuate groove portions located so as to form a substantially annular internal groove and retaining ring means received in said arcuate groove portions to retain said hub members in abutting and driving relationship upon failure of said resilient means.

6. A shaft coupling of limited torsional resilience for retaining a pair of drive shaft members in coaxial torque transmitting relation, said coupling comprising first and second hub members each adapted to be secured to one of said pair of drive shaft members, said hub members being coaxially disposed and having their ends in abutting relationship, torsionally resilient means connecting said hub members to absorb torsional vibrations and transmit torque between said members in proportion to their relative angular displacement from a nominal position, said means being radially stiff to hold said hub members in coaxial alignment, lug means on said first hub member interlocking with fork means on said second hub member to limit the relative angular displacement of said members and form a solid driving connection when said limit is reached, said lug and fork members having internal arcuate groove portions located so as to form a substantially annular internal groove and retaining ring means received in said arcuate groove portions to retain said hub members in abutting and driving relationship upon failure of said resilient means.

7. The combination of claim 6 wherein said hub members include axially directed, overlapping concentric cylindrical portions and said resilient means comprises annular elastic means connecting said concentric cylindrical portions.

8. The combination of claim 7 wherein said elastic means comprise a pair of doughnut-shaped rubber members longitudinally spaced from one another and tightly compressed between said cylindrical portions.

References Cited by the Examiner
UNITED STATES PATENTS

| | | | |
|---|---|---|---|
| 2,691,283 | 10/1954 | Stover | 64—11 |
| 2,895,315 | 7/1959 | Fishtahler | 64—27 |
| 3,138,069 | 6/1964 | Bishop | 64—27 X |
| 3,138,943 | 6/1964 | Gustke | 64—27 |

FRED C. MATTERN, JR., *Primary Examiner.*
H. C. COE, *Assistant Examiner.*